Aug. 30, 1960  R. W. CLAPP  2,951,217
WAVEGUIDE MOTIONAL JOINT
Filed Dec. 31, 1956  2 Sheets-Sheet 1

ROGER W. CLAPP,
INVENTOR

BY  *Edin A. Osen*

AGENT

Aug. 30, 1960

R. W. CLAPP 2,951,217

WAVEGUIDE MOTIONAL JOINT

Filed Dec. 31, 1956

ROGER W. CLAPP,
INVENTOR

AGENT

United States Patent Office 2,951,217
Patented Aug. 30, 1960

2,951,217

WAVEGUIDE MOTIONAL JOINT

Roger W. Clapp, Manhattan Beach, Calif., assignor to Hughes Aircraft Company, Culver City, Calif., a corporation of Delaware Filed Dec. 31, 1956, Ser. No. 632,624

1 Claim. (Cl. 333—10)

This invention relates generally to wave transmission systems and more particularly to a waveguide coupling which permits relative motion between its input and output member.

It is often desirable to connect sections of individual waveguides forming part of a continuous wave transmission system so as to enable such sections a limited degree of relative translational or rotational motion. For example, the antenna of a radar system may be mounted on a stabilized movable frame while the receiver and transmitter are rigidly attached to an aircraft or a ship. Connecting such a stabilized antenna to the unstabilized portion of the radar system requires a motional joint in the wave transmission system permitting limited mechanical movement. Also the antenna of a radar system may undergo oscillatory motion for scanning whereas the transceiver section remains fixed. Coupling such an antenna to the transceiver requires a coupling member having a limited amount of rotational freedom, such as a rotary waveguide joint.

It is therefore an object of this invention to provide a waveguide motional joint which permits either relative translational or rotational displacement between two coupled waveguides which displacement does not affect the unity transfer of wave energy from one waveguide to the other.

It is another object of this invention to provide a phase shifter for electromagnetic waves which permits effective phase control by relative translational or rotational displacement of two waveguides which displacement does not affect the unity transfer of wave energy between the two waveguides.

It is a further object of this invention to provide a waveguide motional joint which is simple in construction, reliable in operation and which has a constant small VSWR (voltage standing wave ratio).

In accordance with one embodiment of this invention, two waveguides are mounted in slidable relationship contiguous to one another, and electrically coupled to one another by an aperture. The aperture defines an apertured section which is adapted to transfer all the power incident on the apertured section from one of the waveguides to the other. It is well known in the art that if two transmission lines with the same propagation constant are suitably coupled over a long length, the power gradually transfers from one guide to the other until all power is in the second guide. Then, if the coupling is continued, the power transfers back to the first guide. Unity coupling is obtained by choosing the length of the aperture so that all the power is transferred from one waveguide into the second waveguide. It has been found that this length permits a relative phase shift of 180° between the fundamental $TE_{01}$-mode of one of the waveguides and the $TE_{02}$-mode propagated by the apertured section.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Figures 1, 2:
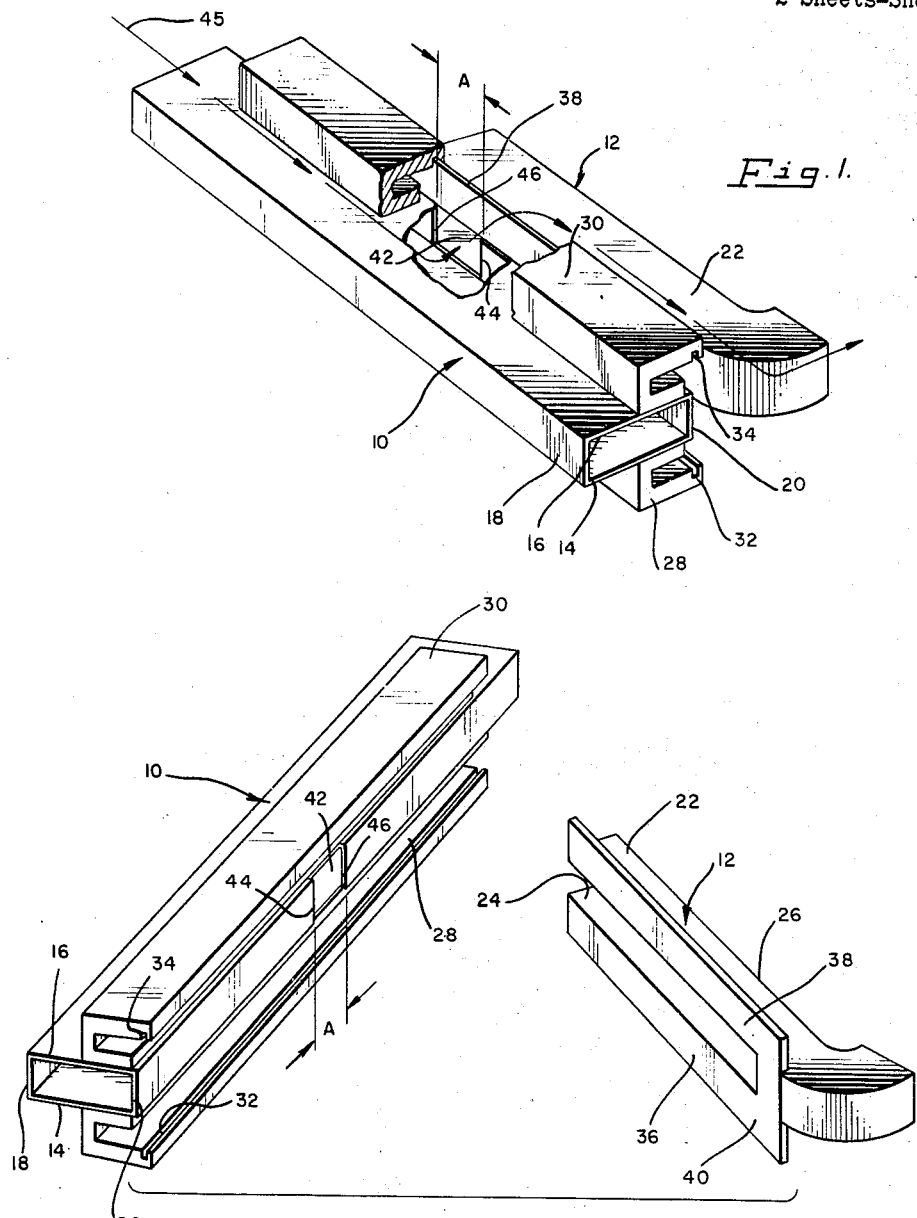
Fig. 1 is a perspective view of one embodiment of the waveguide motional joint of this invention adapted to permit lateral displacement.
Fig. 2 is an exploded perspective view of the motional joint shown in Fig. 1.

Referring now to the drawings and particularly to Figs. 1 and 2 there is shown a pair of contiguous waveguides 10 and 12 coupled to one another in slidable relation. Waveguide 10 has two broad walls 14 and 16 and two narrow walls 18 and 20. Waveguide 12 may have a bend as shown and comprises two broad walls 22 and 24 and a single narrow wall 26. Attached to the broad walls 14 and 16 are a pair of elongated choke sections 28 and 30 forming slots extending parallel to walls 14, 16 and containing respectively, grooves 32 and 34 extending throughout the whole length of the choke section. The grooves 32 and 34 may be considered to be bearing surfaces. The broad walls 22 and 24 of waveguide 12 are provided with a pair of choke flanges or follower members 36 and 38, the thickness of which corresponds to the width of the grooves 32 and 34. The choke flanges 36 and 38 may comprise separate flat members directly attached to the broad walls 22 and 24 or may comprise a single U-shaped member 40 to which the waveguide is attached.

Upon sliding the choke flanges 36 and 38 of the three-sided waveguide 12 shown separately in Fig. 2 into the corresponding grooves 32 and 34 of the choke sections 28 and 30 respectively, to provide a pair of tongue and groove joints two contiguous four-walled waveguides are obtained as shown in Fig. 1. The narrow wall 20 of waveguide 10 has now become a common wall and provides the fourth wall to waveguide 12. Thus combined, both waveguides 10 and 12 are dimensioned for normal propagation of wave energy only in the $TE_{01}$-mode. The method of choke coupling waveguide 12 to the common wall 20 is well known to those skilled in the art and effectively provides a short circuit between the broad walls 22 and 24 of the waveguide 12 and the common narrow wall 20 while permitting relative motion between waveguides 10 and 12 through their tongue and groove joints.

The common wall 20 is also provided with a rectangular aperture 42, the height of which may vary from a narrow slot to a dimension equal to that of the height of the waveguide 10 as defined by the narrow wall 20. The length A of the aperture along the direction of elongation of the waveguide is a critical dimension and must be such that the $TE_{01}$-mode will advance with respect to the $TE_{02}$-mode a distance corresponding to 180 electrical degrees.

To facilitate an understanding of the operation of this invention, the portion of the waveguides 10 and 12 lying between the edges 44 and 46 of the aperture 42 may be regarded as a short waveguide having a length equal to A, a height equal to the narrow wall 20 and a width substantially equal to twice the broad wall of either of the waveguides 10 or 12. In other words the aperture defines an apertured section whose width is substantially equal to the combined widths of waveguides 10 and 12 and which consequently, is adapted to propagate not only the $TE_{01}$, but also the $TE_{02}$-mode.

The operation of the waveguide joint of this invention will now be explained in terms of the apertured section. Wave energy excited and propagated along waveguide 10 (which may be considered the input waveguide) along wave energy path 45 encounters the apertured section 42 and excites therein an additional mode, namely the $TE_{02}$-mode. Since the total energy, of course, remains constant, the $TE_{02}$-mode in turn excites or gives rise to an additional $TE_{01}$-mode confined to the portion of the apertured section lying wholly within waveguide 12 and which is 180° out of phase with the original $TE_{01}$-mode. If the apertured section is of such a length that the faster traveling $TE_{01}$-mode and the slower traveling $TE_{02}$-mode are exactly 180 electrical degrees displaced at the end of the apertured section, the $TE_{01}$-mode in waveguide 10 is cancelled by the portion of the $TE_{02}$-mode in the space occupied by waveguide 10 whereas the $TE_{02}$-mode and the $TE_{01}$-mode, attributable to the space occupied by waveguide 12, are reinforced. Consequently, no wave energy modes will further be excited in waveguide 10 and all the wave energy will be excited at the end of the apertured section in waveguide 12 (which may be considered the output waveguide).

An exhaustive discussion on mode coupling between waveguides by means of a series of rectangular slots or circular holes can be found in "Coupled Wave Theory and Waveguide Applications," by S. E. Miller, Bell System Technical Journal, volume 33, May 1954, pp. 661–719. An application of such mode coupling is described in Patent No. 2,739,288, by H. J. Riblet, entitled Wave Guide Hybrid, issued March 20, 1956, where the length of the apertured section is such as to provide a 90 electrical degree phase shift between the $TE_{01}$-mode and the $TE_{02}$-mode.

As is evident from Figs. 1 and 2 and the description thereof, the waveguides 10 and 12 may now be laterally displaced with respect to one another over a distance limited only by the length of the choke to provide a unity coupling. This coupling is independent of the relative position of the two waveguides and has a large isolation factor and a small VSWR. Isolation of more than 20 db is maintained over a wide band for a three-inch slot while essentially all the power is transferred across the slot. The VSWR remains low over this band.

Figure 3:
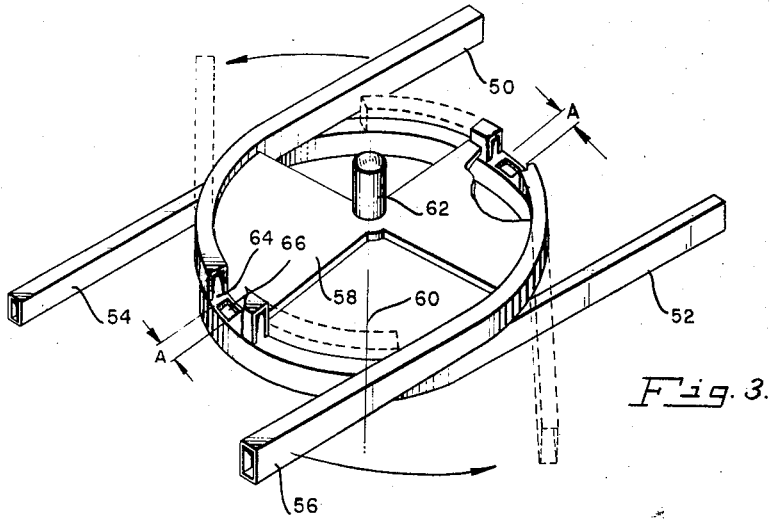
Fig. 3 is a perspective view of a further embodiment of the waveguide motional joint of this invention adapted to permit rotational displacement.

Referring now to Fig. 3, there are shown four waveguides 50, 52, and 54, 56, which provide in combination a dual channel rotary joint. Each of the four waveguides 50, 52, and 54, 56, is made up of a straight portion to provide input and output ports and terminated in a bent portion such as the 90° bend shown, the bend being about the broad walls of the waveguides. Essentially, the bent portions, as will be described in more detail, correspond to a modification of the embodiment of the invention shown in Fig. 1 wherein the straight portions of the waveguides, arranged for translational displacement, are replaced by circular sections of waveguides adapted to be rotatably displaced. Towards achieving this end, waveguides 52 and 54 are fixed in space and waveguides 50 and 56 are rotatably movable by attachment thereof to a plate 58 which is rotatably mounted about an axis 60. Such a rotatable mounting may be accomplished by attaching the plate 58 to a cylindrical shaft 62, whose centerline is concentric with the axis 60 and which is supported by bearings not shown.

Waveguides 50 and 52 provide one channel and waveguides 54 and 56 provide the other channel of the dual channel rotary joint. Because of the symmetry of the arrangement a description of one channel will suffice to describe the operation of both of the channels. The overlapping bent portions of waveguides 50 and 52 form a set of contiguous waveguides having a common wall 64 between them. The common wall is provided with an aperture 66 having a width or height substantially equal to that of the narrow wall of either of the waveguides and a length equal to the dimension A discussed in conjunction with Figs. 1 and 2. Waveguide 50 which may have three walls over the bent portion is joined to waveguide 52 which has four walls by a choke coupling such as the one shown in Figs. 1 and 2. The choke coupling and waveguide 52 effectively provide the fourth wall for waveguide 50 and permit relative rotational motion between them. To achieve greater clarity, the details of the choke coupling are omitted from Fig. 3. Of course, waveguide 50 only has its narrow wall removed over the region corresponding to its bent portion.

To assure that waveguide 50 is provided with a fourth wall along its operable portion the common wall of waveguide 52 may be extended beyond the end portion of the waveguide 52 for an additional 90° bend. The operable portion referred to is the portion starting at the apertured section for all angular positions between the contiguous waveguides 50 and 52. In other words, waveguide 52 may be provided with a total of a 90° four-wall bend and a 90° extension of the single narrow wall bend capable of choke mounting to waveguide 50. There are a great many other ways in which the operable portion of waveguide 50 may be provided with a fourth wall as will be apparent to those skilled in the art.

The operation of the dual channel rotatable joint is essentially the same as that of the translational motional joint of Fig. 1. Wave energy excited, for example, in waveguide 50 is propagated down through the 90° bend to the apertured section defined by aperture 66. On reaching the apertured section, a $TE_{02}$-mode and an additional $TE_{01}$-mode is excited, the latter mode being out of phase with the exciting mode. If the length of the apertured section is A, the $TE_{01}$-mode is advanced 180 electrical degrees with respect to the $TE_{02}$-mode and all the wave energy will be transferred to waveguide 52. The same is true for wave energy excited in waveguide 54 which is transferred to waveguide 56.

It should be obvious to those skilled in the art that the dual channel rotary joint shown in Fig. 3 may be modified to either a single channel rotary joint by removing one set of waveguides or to a multiple channel rotary joint by adding further sets of waveguides, i.e. by stacking two or more dual channel rotary joints on top of one another.

Figure 4:
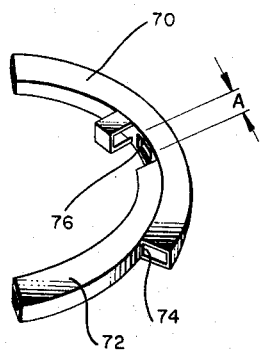
Fig. 4 is a perspective partial view of a still further embodiment of a waveguide arrangement permitting rotational movement which may be substituted for the embodiment shown in Fig. 3.

Fig. 4 shows an alternate spacial arrangement of the bent waveguide portions which may be used for a rotary joint similar to the one shown in Fig. 3. In accordance with this modification, two waveguides 70 and 72 are bent about their narrow walls into a circular arc in contradistinction to bending the waveguides about their broad walls as shown in Fig. 4. The three-walled portion of waveguide 72 is choke coupled, as explained previously, to waveguide 70 so that wall 74 becomes a common wall.

Figure 5:
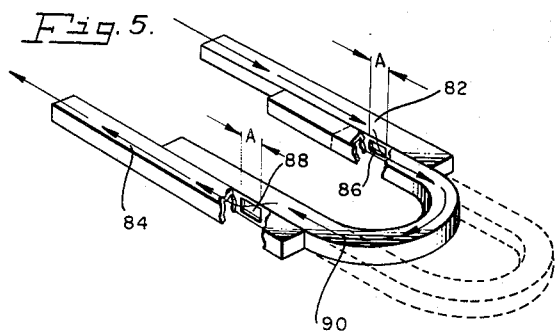
Fig. 5 is a perspective view of a single channel phase shifter in accordance with this invention.

As is immediately apparent to one skilled in the art, the invention shown in Fig. 1, in addition to being a new motional joint, also provides a wave energy path whose length may be varied at will. It is therefore inherently capable of operation as a phase shifter. Fig. 5 shows an embodiment of a phase shifter wherein two waveguides 82 and 84 are each provided with an aperture 86 and 88 in one of its narrow walls. The length of the aperture is "A," a dimension defined above. A third waveguide 90 bent into a U-shape has a portion of the outer narrow wall removed along the straight sections or legs of the U-shape. These straight sections are choke coupled to the waveguides 82 and 84 in a manner similar to that shown in Fig. 1 so as to permit lateral motion.

Wave energy excited, for example, in waveguide 82 travels down the waveguide to the apertured section defined by the aperture 86. Because the aperture is of length A, and in accordance with the above description of the effect of this aperture length, all the wave energy is transferred to waveguide 90. Waveguide 90 propagates the wave energy around the 180° bend where it encounters the apertured section defined by the aperture 88. The wave energy is therefore completely transferred into the waveguide 84. Slidable motion of waveguide 90 will provide a change in the wave energy path equal to twice the lateral displacement of that waveguide. It is well understood that a change of the wave energy path by a fraction of a wavelength changes the phase of the wave at the output port with respect to the input port.

Figure 6:
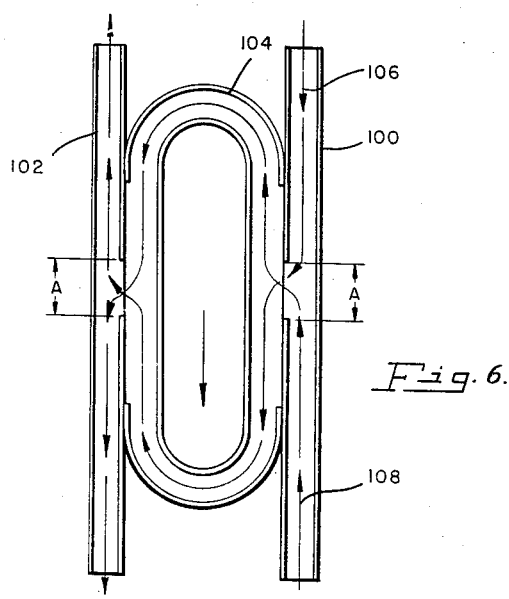
Fig. 6 is a plan view of a dual channel phase shifter in accordance with this invention.

Fig. 6 is a dual channel phase shifter having two straight line waveguide portions 100 and 102 and slidably mounted between them a third waveguide 104 which forms a continuous or closed loop and has two 180° bends connecting two straight line portions. Waveguides 100 and 102 are each provided with an aperture of length A. Waveguide 104 is slidably mounted in a choke coupling not shown in Fig. 6. Wave energy excited in waveguide 100 will follow either the path designated by reference number 106 or the path designated by reference number 108 depending upon the waveguide end which is excited. As is immediately apparent from Fig. 6, the phase shift introduced in either the path 106 or the path 108 is proportional to twice the lateral displacement of the waveguide 104, and furthermore, one of the waveguide paths is lengthened by an amount equal to that by which the other waveguide path is shortened.

The waveguide couplers and phase shifter described herein and illustrated in the drawings are reversible in operation. Therefore the operation remains the same if the input and the output ports of the waveguides are exchanged. There has been disclosed a waveguide coupler which permits either translational or rotational movements. The waveguide coupler of this invention may also be utilized as a phase shifter. The outstanding advantages of this invention are the mechanical simplicity of the coupler, its high power handling capacity and its electrical insensitivity to translational or rotational motion.

What is claimed is:

A phase shifter comprising, a first and a second rectangular waveguide, each having two broad walls and two narrow walls, a third rectangular waveguide having two parallel straight leg portions joined to one another by two 180° bends to form a closed continuous wave energy transmission line, said bends having each two broad walls and two narrow walls, said leg portions having each two broad walls and a narrow wall, each of said leg portions being disposed contiguous to one of said first and second waveguides so that one of the narrow walls of said first and said second waveguides is common to both said leg portions and said first and second waveguides, choke means coupling said common narrow walls to said leg portions, said choke means permitting sliding motion of said third waveguide with respect to said first and second waveguides, each of said common walls being provided with a substantially rectangular aperture of predetermined length, said aperture defining two apertured sections having a width equal to substantially twice the width of each of said waveguides and a height substantially equal to the height of said common walls, and said apertured sections being adapted to effectively couple all wave energy propagated by one of said first and second waveguides to the third waveguide and from the third waveguide to the other one of said first and second waveguides, the relative position of said slidable third waveguide with respect to said first and second waveguides determining the electrical path length of said phase shifter.

References Cited in the file of this patent

UNITED STATES PATENTS

| | | |
|---|---|---|
| 2,737,633 | Tomiyasu | Mar. 6, 1956 |
| 2,751,556 | Tomiyasu | June 19, 1956 |
| 2,826,742 | Hollis | Mar. 11, 1958 |
| 2,850,706 | Gabriel | Sept. 2, 1958 |